United States Patent
Mascull

(10) Patent No.: US 7,320,500 B2
(45) Date of Patent: Jan. 22, 2008

(54) SEAT

(76) Inventor: Graham John Mascull, 21 Tucker Street, Ashburton (NZ) 8300

( * ) Notice: Subject to any disclaimer, the term of this patent is extended or adjusted under 35 U.S.C. 154(b) by 111 days.

(21) Appl. No.: 11/302,708

(22) Filed: Dec. 13, 2005

(65) Prior Publication Data

US 2006/0279118 A1    Dec. 14, 2006

(30) Foreign Application Priority Data

Jun. 8, 2005    (NZ) ...................... 540611

(51) Int. Cl.
*A47D 1/10* (2006.01)

(52) U.S. Cl. .................. 297/256.16; 297/256.13; 297/256.1; 297/130; 297/118

(58) Field of Classification Search ........ 297/130, 297/118, 256.16, 250.1
See application file for complete search history.

(56) References Cited

U.S. PATENT DOCUMENTS

| | | | | |
|---|---|---|---|---|
| 5,354,079 A | * | 10/1994 | Hettenbach | 280/33.991 |
| 5,820,144 A | * | 10/1998 | Wang | 280/47.38 |
| 5,927,806 A | * | 7/1999 | Ohlson | 297/256.17 |
| 6,318,807 B1 | * | 11/2001 | Perego | 297/440.22 |
| 6,428,100 B1 | * | 8/2002 | Kain et al. | 297/256.16 |

* cited by examiner

*Primary Examiner*—David Dunn
*Assistant Examiner*—Erika Garrett
(74) *Attorney, Agent, or Firm*—Blakely Sokoloff Taylor & Zafman LLP

(57) ABSTRACT

A seat having a main support base 1, a backrest 2 for supporting the back of a person, and an area 3 for receiving the posterior of a person, the base having a plurality of outwardly opening recesses, e.g., 6, 7, and 8, at a first end part of the seat and at least one locking recess, e.g., 9, at a second end part of the seat, the first and second end parts being at or near substantially opposite ends of the seat, and locking means, e.g., 10/11, adapted to releasably lock the seat to a support frame when it is in use; the seat formed such that when it is in use it releasably fits to the support frame and is lockable thereto by maneuvering the seat so that a first part of the support frame is within at least one of the recesses at the first end part of the seat and pivoting the seat about that first part of the support frame until the locking recess engages a second part of the support frame; the seat being adjustable in that it can be set to alternative recline positions depending on which one of the recesses at the first end part of the seat engages the first part of the support frame.

9 Claims, 6 Drawing Sheets

SEAT

FIELD OF INVENTION

This invention relates to a seat. A preferred form of the invention relates to a seat for use with those in need of special care.

BACKGROUND

In the context of caring for people with physical disabilities it is known to employ a seat which can be fitted to more than one support structure. For example a seat for an infant may be used interchangeably on a stroller and a stationary support frame. It is accordingly an object of one embodiment of the present invention to provide a seat which can be fitted to a support frame and removed when desired, or to at least provide the public with a useful choice.

The term "comprising", and derivatives thereof such as "comprises", etc., if and when used herein, should be interpreted to mean "consisting or including"—i.e., they are not intended to be limiting.

Terms such as "downwards" and "front", etc., should be taken as relating to the normal in-use orientation of the invention.

SUMMARY OF THE INVENTION

According to one aspect of the invention there is provided a seat having a main support base, a backrest for supporting the back of a person, and an area for receiving the posterior of a person, the base having a plurality of outwardly opening recesses at a first end part of the seat and at least one locking recess at a second end part of the seat, the first and second end parts being at or near substantially opposite ends of the seat, and locking means adapted to releasably lock the seat to a support frame when it is in use; the seat formed such that when it is in use it releasably fits to the support frame and is lockable thereto by maneuvering the seat so that a first part of the support frame is within at least one of the recesses at the first end part of the seat and pivoting the seat about that first part of the support frame until the locking recess engages a second part of the support frame; the seat being adjustable in that it can be set to alternative recline positions depending on which one of the recesses at the first end part of the seat engages the first part of the support frame.

Optionally there are at least four of the recesses at the first end part of the seat arranged as two pairs, the recesses within each pair substantially horizontally aligned with one another at opposite side parts of the seat.

Optionally there are at least six of the recesses at the first end part of the seat arranged as three pairs, the recesses within each pair substantially horizontally aligned with one another at opposite side parts of the seat.

Optionally the recesses at the first end part of the seat open outwards of the seat behind the back rest.

Optionally the recesses at the first end part of the seat open outwards of the seat behind the back rest, and there are two of the locking recesses each opening substantially downwards of the seat and generally horizontally aligned at opposite side parts of the seat.

Optionally the recesses at the first end part of the seat open outwards of the seat behind the back rest, and there are two of the locking recesses each opening substantially downwards of the seat and generally horizontally aligned at opposite side parts of the seat, and the backrest and the area for receiving the posterior of the person are padded to give comfort to the person when the seat is in use.

Optionally the seat is in combination with a support frame as described above.

Optionally the seat is in combination with a support frame as described above, wherein the recesses at the first end part of the seat open outwards of the seat behind the back rest, and there are two of the locking recesses each opening substantially downwards of the seat and generally horizontally aligned at opposite side parts of the seat.

Optionally the seat is in combination with a support frame as described above, the recesses at the first end part of the seat open outwards of the seat behind the back rest, there are two of the locking recesses each opening substantially downwards of the seat and generally horizontally aligned at opposite side parts of the seat, and the support frame forms at least part of a stroller or a stationary frame.

According to a specific embodiment of the invention there is provided a seat having a main support base, a backrest for supporting the back of a person, and an area for receiving the posterior of a person, the base having a plurality of substantially horizontally aligned pairs of outwardly opening recesses at a first end part of the seat behind the backrest and a pair of substantially horizontally aligned locking recesses at a second end part of the seat in front of the back rest, the first and second end parts being at or near substantially opposite ends of the seat, and locking means adapted to releasably lock the seat to a support frame when it is in use; the seat formed such that when it is in use it releasably fits to the support frame and is lockable thereto by maneuvering the seat so that a first part of the support frame is within at least one of the recesses at the first end part of the seat and pivoting the seat about that first part of the support frame until the locking recesses engage a second part of the support frame; the seat being adjustable in that it can be set to alternative recline positions depending on which one of the substantially horizontally aligned pairs of recesses at the first end part of the seat engage the first part of the support frame.

DESCRIPTION OF THE DRAWINGS

Some preferred forms of the invention will now be described by way of example and with reference to the accompanying drawings, of which.

DETAILED DESCRIPTION

Figure 1:
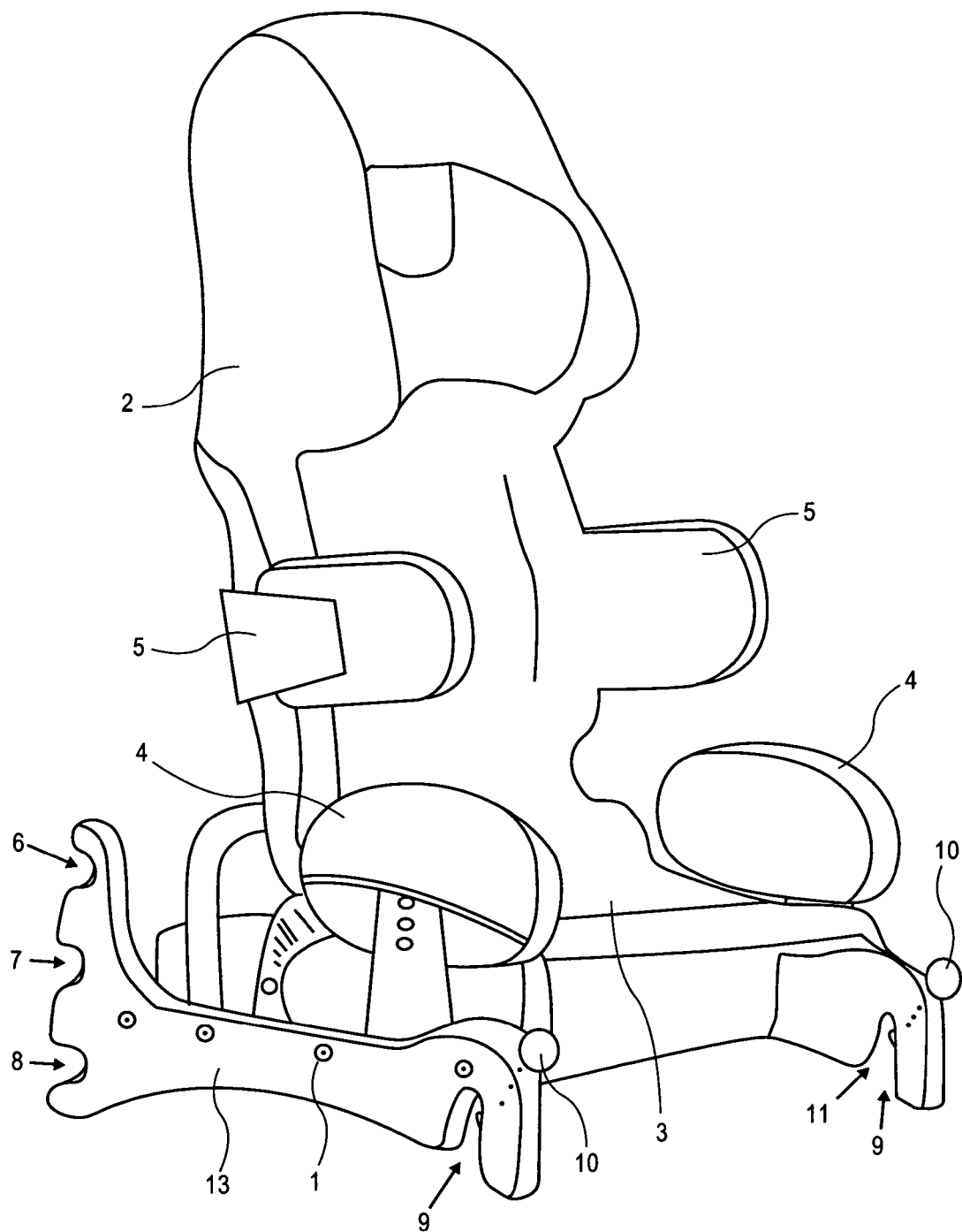
FIG. 1 is a perspective view showing the front and side of a seat according to the present invention.
Figure 2:
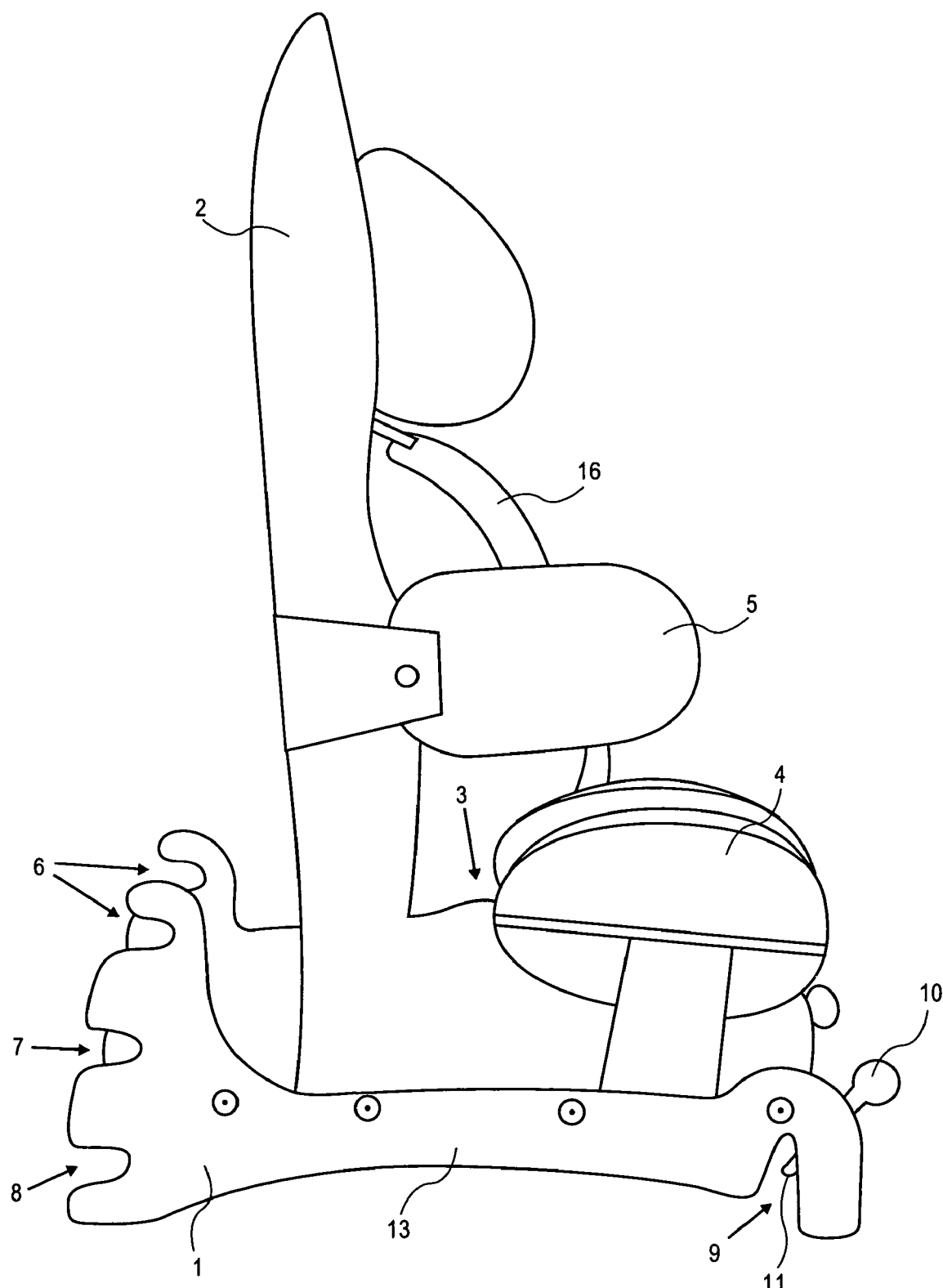
FIG. 2 is a perspective view showing a side of the seat.
Figure 3:
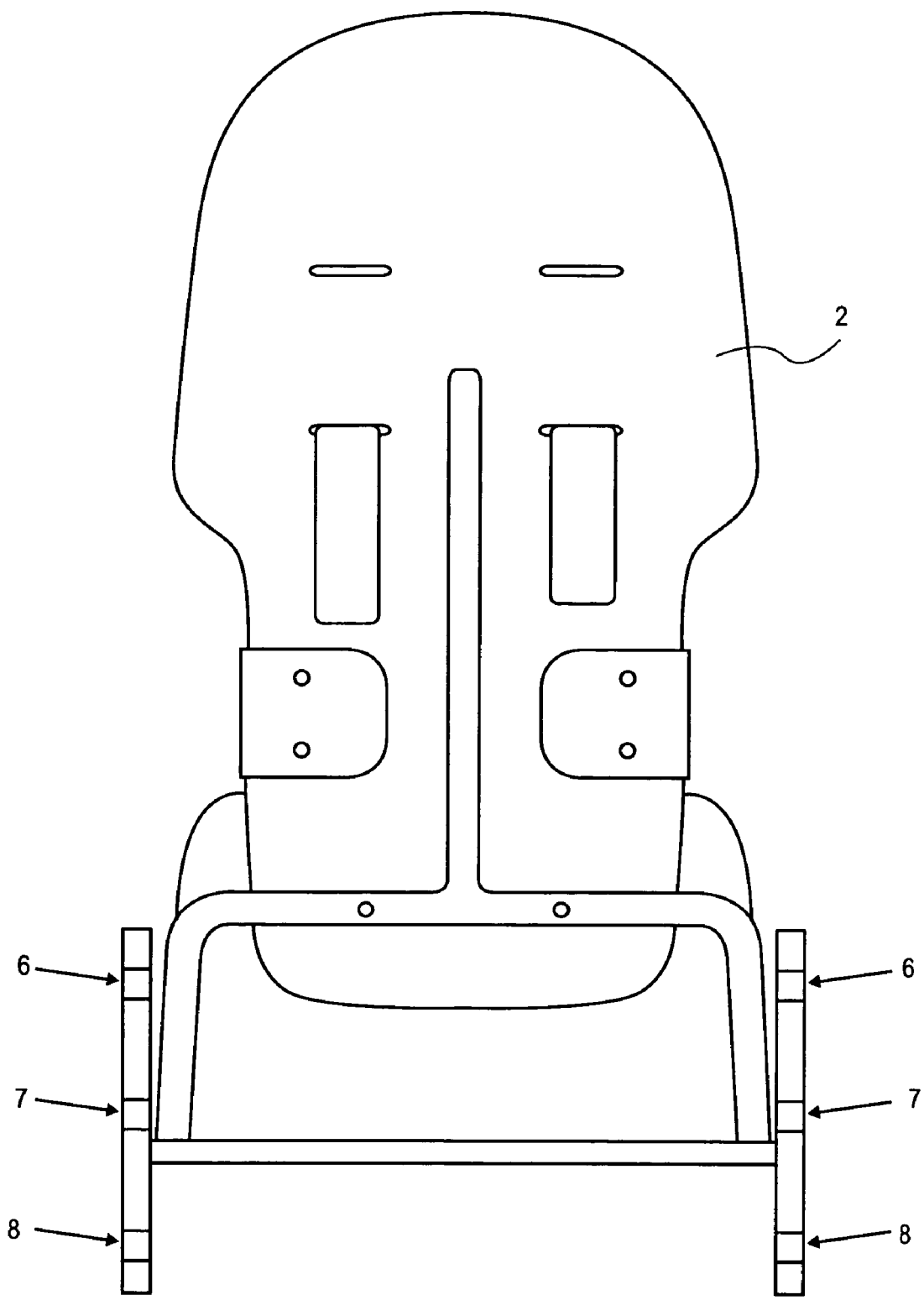
FIG. 3 is a perspective view showing the rear of the seat.

Referring to FIG. 1, the seat comprises a main support base 1, a backrest 2, an area 3 for receiving the posterior of a child, a pair of hip guides 4, and a pair of lateral torso supports 5. The base 1 has three pairs of recesses 6, 7 and 8 horizontally aligned at opposite sides of the seat behind the backrest, although only one recess in each pair is visible in FIG. 1. The second recess in the uppermost pair 6 is shown in FIG. 2 and the other recesses in each pair are visible in FIG. 3. The front of the base 1 has a pair of horizontally aligned downwards opening locking recesses 9. Each locking recess 9 has a knob 10 for retracting a spring loaded locking pin 11. By pulling the knobs outwards the locking pins move to increase the opening of each locking recess 9. By subsequently releasing each knob the locking pins move to their original position to obstruct the locking recesses 9. In alternative embodiments of the invention the knobs and locking pins may be oriented inwards of the seat.

Figure 5:
FIG. 5 is a perspective view showing the seat when fitted to a stroller.
Figure 6:
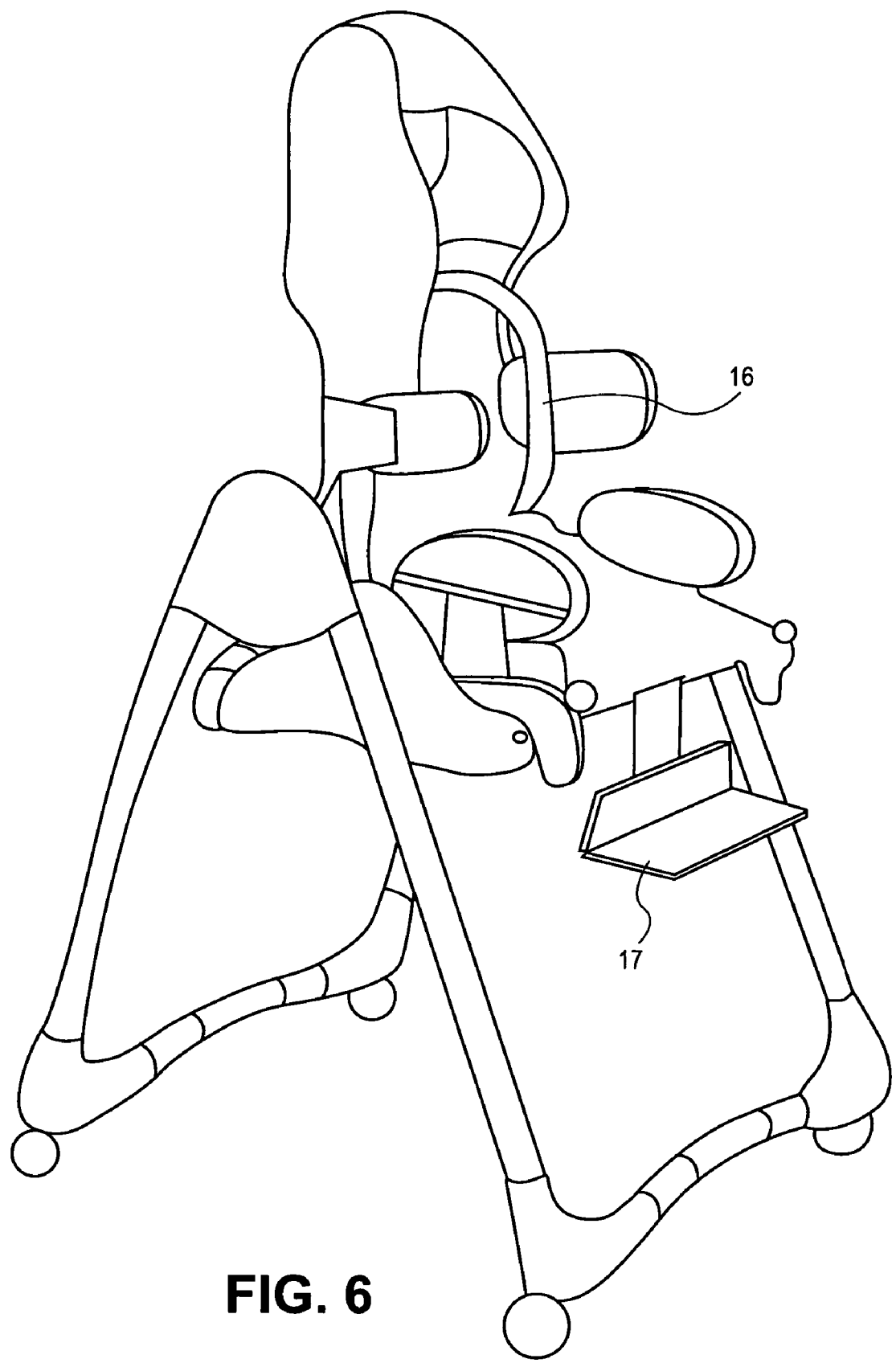
FIG. 6 is a perspective view showing the seat fitted to an in-house support frame.

When the seat is in use it can be fitted to a support frame forming part of a stroller as shown in FIG. 5, or forming part of a high chair or other structure as shown in FIG. 6. To achieve this one selects a pair of horizontally aligned recesses from the pairs 6, 7, or 8 behind the backrest, and maneuvers the seat so that only the selected pair receives a horizontal rear cross bar of the support frame. The seat is then pivoted about the rear cross bar until the locking recesses 9 move down onto a horizontal front cross bar of the support frame. To enable a locking engagement with the front cross bar the knobs 10 are pulled outwards to open the locking recess 9 enough to fully receive the front cross bar. The knobs are then released so that the spring loaded pins 11 move across at least part of the front cross bar. The depth of the recesses 6, 7 and 8, coupled with the depth of the locking recesses 9 and the obstruction provided by the locking pins 11, means that the seat cannot be released from the support frame until the knobs 10 are again pulled outwards and the locking recesses 9 are pivoted upwards to clear the front cross bar.

It will be appreciated that the angle or extent of recline of the seat with respect to the support frame will be dependant on which pair of recesses is chosen from the pairs 6, 7 and 8. By choosing a higher pair the incline increases and by choosing a lower pair the incline decreases. While the seat has been shown with three pairs of recesses, in alternative embodiments there may be more or fewer pairs.

Figure 4:
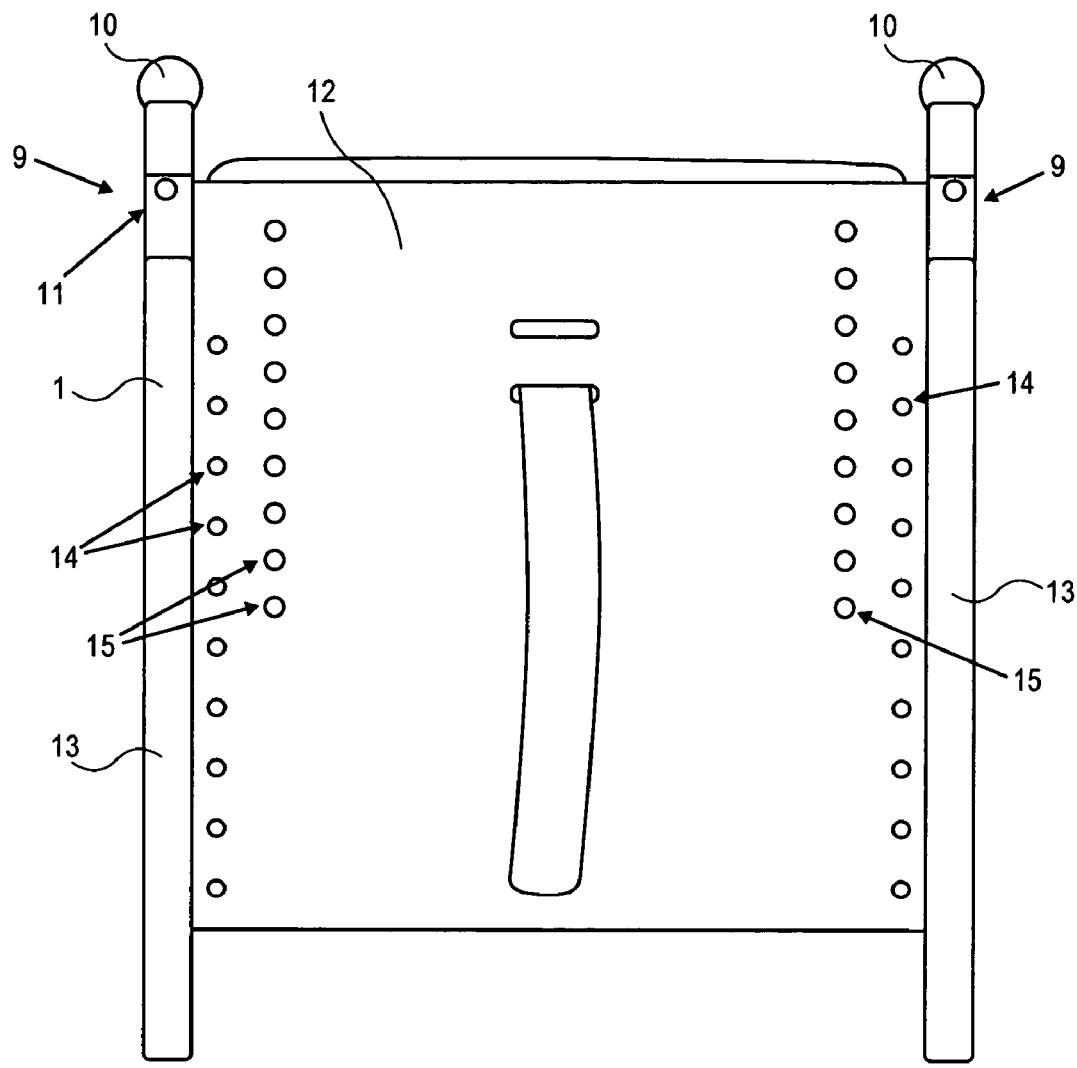
FIG. 4 is a perspective view of the underside of the seat.

Referring to FIG. 4, the base 1 may incorporate a shallow tray 12 (which may be formed from a metallic or plastic material, or any other suitable substance) fixed to two opposite plastic side pieces 13 (which be formed from a plastic material or any other suitable substance). It is the side pieces that have the recesses 6, 7, 8 and 9 and the locking pins 11. As shown in FIG. 4, each side of the tray 12 has an inner line of apertures 15 and an outer line of apertures 14. The apertures of each inner line 15 provide fixing points for the hip guides 4 and those of the outer lines 14 provide fixing points for the backrest 2. Depending on which apertures are chosen from the lines 14 and 15 the depth of the seat can be adjusted as desired. For example, by positioning the backrest further forward the seat is made shallower, and by positioning it further back the depth of the seat is increased.

Preferably the seat incorporates a harness 16 (see FIG. 2) for restraining an infant when he or she is seated therein. The harness may involve a shoulder strap or straps and/or a lap strap or straps.

In some embodiments of the invention the seat may incorporate a foot plate 17 as shown in FIGS. 5 and 6, although that is not essential. In some cases the backrest 2 may be hinged to the base 1 to assist in adjusting the incline of the backrest with respect to the base.

In some embodiments of the invention the recesses 6, 7 and 8 behind the backrest may be partially hooked to prevent one from inadvertently withdrawing the seat from the support frame in an undesirably fast and uncontrolled manner.

While some preferred forms of the invention have been described by way of example it should appreciated that modifications and improvements can occur without departing from the scope of the appended claims.

The invention claimed is:

1. A seat in combination with a support frame, the seat having a main support base, a backrest above the base for supporting the back of a person, and an area for receiving the posterior of a person, the base having a plurality of outwardly opening recesses at a first end part of the seat, such recesses facing substantially rearwards with respect to the seat, and at least one substantially downwardly facing locking recess at a second end part of the seat, the first and second end parts being at or near substantially opposite ends of the seat, and locking means adapted to reversibly close the locking recess to releasably lock the seat to the support frame when the seat is in use;

the seat formed such that when it is in use it is able to releasably fit to the support frame and is lockable thereto by maneuvering the seat so that a first part of the support frame is within at least one of the recesses at the first end part of the seat and pivoting the seat about that first part of the support frame until the locking recess engages a second part of the support frame; and the seat being adjustable in that it can be set to alternative recline positions depending on which one of the recesses at the first end part of the seat engages the first part of the support frame.

2. A seat according to claim 1, wherein there are at least four of the recesses at the first end part of the seat arranged as two pairs, the recesses within each pair substantially horizontally aligned with one another at opposite side parts of the seat.

3. A seat according to claim 1, wherein there are at least six of the recesses at the first end part of the seat arranged as three pairs, the recesses within each pair substantially horizontally aligned with one another at opposite side parts of the seat.

4. A seat according to claim 1, wherein the recesses at the first end part of the seat open outwards of the seat behind the back rest.

5. A seat according to claim 1, wherein the recesses at the first end part of the seat open outwards of the seat behind the back rest, and wherein there are two of the locking recesses each opening substantially downwards of the seat and generally horizontally aligned at opposite side parts of the seat.

6. A seat according to claim 1, wherein the recesses at the first end part of the seat open outwards of the seat behind the back rest, and wherein there are two of the locking recesses each opening substantially downwards of the seat and generally horizontally aligned at opposite side parts of the seat, and wherein the backrest and the area for receiving the posterior of the person are padded to give comfort to the person when the seat is in use.

7. A seat according to claim 1, wherein the support frame forms at least part of a stroller or a stationary frame.

8. In combination with a support frame, a seat having a main support base, a backrest above the base for supporting the back of a person, and an area for receiving the posterior of a person, the base having a plurality of substantially horizontally aligned pairs of outwardly opening recesses at a first end part of the seat, such recesses facing substantially rearwards with respect to the seat behind the backrest and a pair of substantially horizontally aligned substantially downwardly facing locking recesses at a second end part of the seat in front of the back rest, the first and second end parts being at or near substantially opposite ends of the seat, and locking means adapted to reversibly close the locking recesses to releasably lock the seat to the support frame when the seat is in use;

the seat formed such that when it is in use it releasably fits to the support frame and is lockable thereto by maneuvering the seat so that a first part of the support frame is within at least one of the recesses at the first end part of the seat and pivoting the seat about that first part of the support frame until the locking recesses engage a second part of the support frame; and the seat being adjustable in that it can be set to alternative recline positions depending on which one of the substantially horizontally aligned pairs of recesses at the first end part of the seat engage the first part of the support frame.

9. A seat according to claim 8, fitted to the support frame when the support frame is part of a stroller or a stationary frame.

\* \* \* \* \*